(12) United States Patent  (10) Patent No.: US 8,976,157 B2
Hwang  (45) Date of Patent: Mar. 10, 2015

(54) CAMERA MODULE AND OPTICAL TOUCH SCREEN USING THE SAME

(75) Inventor: Woong Hwang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 122 days.

(21) Appl. No.: 13/808,044

(22) PCT Filed: Jul. 14, 2011

(86) PCT No.: PCT/KR2011/005176
§ 371 (c)(1),
(2), (4) Date: Jan. 2, 2013

(87) PCT Pub. No.: WO2012/018179
PCT Pub. Date: Feb. 9, 2012

(65) Prior Publication Data
US 2013/0106788 A1  May 2, 2013

(30) Foreign Application Priority Data
Aug. 2, 2010 (KR) .................. 10-2010-0074590

(51) Int. Cl.
G06F 3/042 (2006.01)

(52) U.S. Cl.
CPC .............. *G06F 3/042* (2013.01); *G06F 3/0428* (2013.01)

USPC .......................................... 345/175

(58) Field of Classification Search
None
See application file for complete search history.

(56) References Cited

U.S. PATENT DOCUMENTS 5,708,460 A * 1/1998 Young et al. .................. 345/173
2006/0007185 A1 * 1/2006 Kobayashi .................... 345/176

FOREIGN PATENT DOCUMENTS

| JP | 2005-276019 A | 10/2005 |
| KR | 10-2009-0026957 A | 3/2009 |
| KR | 10-2009-0092878 A | 9/2009 |
| KR | 10-2010-0056117 A | 5/2010 |

* cited by examiner

Primary Examiner — Nicholas Lee
(74) Attorney, Agent, or Firm — Birch, Stewart, Kolasch & Birch, LLP

(57) ABSTRACT

The present invention relates to a camera module and an optical touch screen using the same, the camera module including an infrared emitting diode (100) for emitting infrared ray, a linear sensor (150) for detecting a touched area by detecting infrared ray reflected from a retro reflector, and an infrared pass filter (130) for passing the infrared ray emitted from the infrared emitting diode (100) and infrared ray incident on the linear sensor (150).

15 Claims, 5 Drawing Sheets

CAMERA MODULE AND OPTICAL TOUCH SCREEN USING THE SAME

TECHNICAL FIELD

The teachings in accordance with the exemplary embodiments of this invention relate generally to a camera module and an optical touch screen using the same.

BACKGROUND ART

A touch screen or touch panel is a display which can detect the location of touches within the display area, usually performed either with the human hand or a stylus. This allows the display to be used as an input device, removing the keyboard and/or the mouse as the primary input device for interacting with the display's content.

Technically speaking, the commonly used touch screens employ resistive, capacitive, surface acoustic wave (SAW), electromagnetic, vector force and optical touch modes. Among these types of touch screens, resistive type is the most common one, which has approximately 60% of market share (the second is capacitive type with around 24% of market share). Each of these types of touch screens has its own features, advantages and disadvantages.

Now, these touch screens are briefly explained.

The resistive is a common type of touch screen technology. It is a low-cost solution found in many touch screen applications, including hand-held computers, PDA's, consumer electronics, and point-of-sale-applications. The resistive touch screens are such that a pair of resistive layers facing with each other is provided on a touch screen element. The pressed position is detected by contact between the resistive layers so that one of the resistive layers is formed on a flexible film for deformation during pressing. As mentioned above, the resistive film type is widely used, but disadvantageous due to degraded mechanical and environmental reliability. At the same time, although the resistive touch screen today are widely used on consuming electronic products, it is unable to identify multiple contact points simultaneously on its display area.

The surface acoustic wave (SAW) touch screen first converts an electric signal into an ultrasonic wave through a transducer, and then directly transmits the ultrasonic wave through a surface of the touch panel. When the touch panel is used, the ultrasonic wave may be absorbed by contacting a pointer to cause attenuation, and an accurate position of the contact is obtained through comparison and calculation between attenuation amounts before and after use. The surface acoustic wave touch screen is disadvantageous due to generation of noise and/or susceptibility to noise.

The electromagnetic type touch screen is such that, in the field of magnetism, a magnetic field is normally generated by a coil due to electromagnetism and said magnetic field induces a voltage in another coil, also called receiver coil, under the premise that the magnetic field strength changes in the receiver coil. It is clear that a non-moving receiver coil is not capable to measure a non-altering magnetic field since no voltage is induced by said magnetic field. There are already means, which can measure a position and/or orientation of a receiver means in relation to a specific magnetic field generating means. To measure the orientation in a 3-dimensional space normally three orthogonal arranged probes are used to calculate the coordinates. These arrangements are most of the time very bulky, space taking and needs a special stylus.

The capacitance type touch screen adopts capacity changes generated from the combination of static electricity between arranged transparent electrodes and a human body, so as to detect coordinates of the contact position through a generated induced current. That is, the capacitance type touch screen includes one substrate having an electrode formed thereon. In the capacitance type touch panel, when, for example, a finger contacts and approaches the touch panel, a variation in capacitance between the electrode and the finger is detected, thereby detecting input coordinates. Since the capacitance type touch panel is a non-contact type, it has high durability, excellent environmental and mechanical reliability due to changeable upper barrier layer unlike the resistive film type touch panel. However, the capacitance type touch panel has disadvantages in that it is difficult to input information with fingers or a pen.

The optical type touch screens principally use no films for touch recognition such that transmittance is 100%. Furthermore, no reflexibility, degradation of brightness and blurring of displays are generated from these optical touch screens. Maintenance of transmittance and brightness in displays is an important factor for image clarity, such that an optical type is adequate for implementation of high quality screens. Furthermore, the optical type touch screens utilize the principle of light source reception and blocking, such that no load is applied to a sensor as detection is not performed by physical or electrical contacts, which increases reliability for use in factory monitoring, various automation equipment and ATM's. The optical type touch screens are advantageously free from such materials as films or ITO (Indium Tin Oxide) protective films to have less susceptibility to scratches or external shocks and a lower error probability including erroneous operation.

DISCLOSURE OF INVENTION

Technical Problem

The present invention is directed to simplify processes.

Technical problems to be solved by the present invention are not restricted to the above-mentioned, and any other technical problems not mentioned so far will be clearly appreciated from the following description by skilled in the art.

Solution to Problem

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided a camera module, the module characterized by: an infrared emitting diode for emitting infrared ray; a linear sensor for detecting a touched area by detecting infrared ray reflected from a retro reflector; and an infrared pass filter for passing the infrared ray emitted from the infrared emitting diode and infrared ray incident on the linear sensor.

Preferably, the infrared pass filter includes a first area through which the infrared ray emitted from the infrared emitting diode passes, and a second area discretely located from the first area for passing the infrared ray incident on the linear sensor.

Preferably, the first and second areas are integrally formed, and an air layer is formed between the first and second areas.

Preferably, the first area is inclined at 3~11 degrees.

Preferably, the camera module includes a holder formed at one side with a first groove, and at the other side with a second groove, and formed with an opening connecting the first and second grooves, and formed at an upper surface of the one side with a stair unit, wherein the first groove is mounted with an object lens, the second groove is mounted with the infrared pass filter, a printed circuit board mounted with an image sensor is attached to the holder, and the stair unit is mounted with the infrared emitting diode.

Preferably, the infrared pass filter mounted at the second groove is implemented by coating on a glass an infrared pass filter material passing an infrared ray of a particular wave band.

Preferably, the first area of the infrared pass filter is aligned with the infrared emitting diode, and the second area of the infrared pass filter is aligned with the object lens.

In another general aspect of the present invention, there is provided an optical touch screen using a camera module, the screen characterized by: a flat plate display panel; a case mounted and assembled with the flat plate display panel; a bracket assembled on the case; a camera module mounted on the bracket; and an infrared pass filter passing infrared ray emitted from the camera module and infrared ray incident on the camera module.

Preferably, the camera module includes an infrared emitting diode emitting infrared ray, and a linear sensor for detecting a touched area by detecting infrared ray reflected from a retro reflector.

Preferably, the infrared pass filter includes a first area through which the infrared ray emitted from the infrared emitting diode passes, and a second area discretely located from the first area for passing the infrared ray incident on the linear sensor.

Preferably, the first and second areas are integrally formed, and an air layer is formed between the first and second areas.

Preferably, the first area is inclined at 3~11 degrees.

Preferably, the bracket includes first and second fixtures fixed on the case, and a connector connected to the first and second fixtures, wherein the camera module is mounted to a rear surface of the connector, and the infrared pass filter is mounted on a front surface of the connector.

Preferably, the connector of the bracket includes an iris for adjusting amount of infrared ray incident on the camera module, and a passage through which the infrared ray emitted from the camera module passes.

Preferably, the camera module includes a holder formed at one side with a first groove, and at the other side with a second groove, and formed with an opening connecting the first and second grooves, and formed at an upper surface of the one side with a stair unit, wherein the first groove is mounted with an object lens, the second groove is mounted with the infrared pass filter passing an infrared ray of a particular wave band, a printed circuit board mounted with an image sensor is attached to the holder to close the second groove, and the stair unit is mounted with the infrared emitting diode.

Preferably, the infrared pass filter mounted at the second groove is implemented by coating on a glass an infrared pass filter material passing an infrared ray of a particular wave band.

Preferably, the first area of the infrared pass filter is aligned with the infrared emitting diode, and the second area of the infrared pass filter is aligned with the object lens.

Preferably, the case takes the shape of a square ring.

Preferably, three inner corners of the square ring-shaped case are fixed by brackets on which the camera module is mounted, and one inner corner of the square-ring shaped case is mounted with a dummy bracket on which the camera module is not mounted.

Preferably, a retro reflector is mounted on an inner lateral surface of the case among the brackets.

Advantageous Effects of Invention

The camera module and optical touch screen using the same according to the present invention has an advantageous effect in that an infrared pass filter, integrally formed with a first area and a second area through which infrared ray emitted from the camera module and infrared ray incident on the camera module, is implemented to perform a simple assembly process mounting a connector of a bracket, whereby processes can be simplified.

The camera module and optical touch screen using the same according to the present invention has an advantageous effect in that two constituent elements, through which infrared ray emitted from the camera module and infrared ray incident on the camera module can pass, are integrally formed to reduce the manufacturing cost.

The camera module and optical touch screen using the same according to the present invention has an advantageous effect in that the infrared pass filter is integrally formed to enable an easy alignment with the camera module.

The camera module and optical touch screen using the same according to the present invention has an advantageous effect in that mutual interference between infrared ray emitted from the camera module and infrared ray incident on the camera module is prevented to improve a touch sensitivity.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

Figure 1:
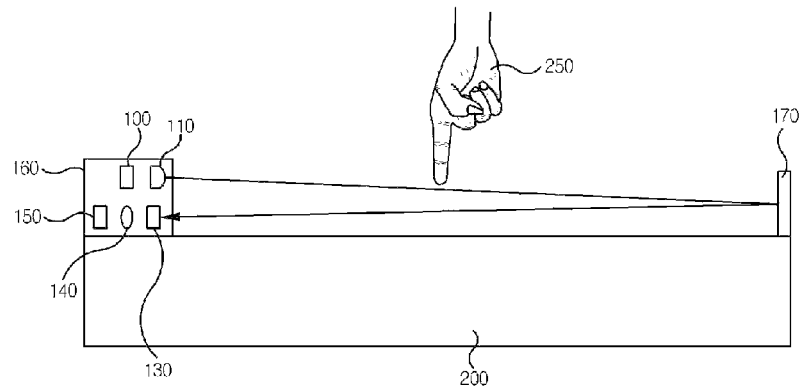
FIG. 1 is a conceptual cross-sectional view illustrating an optical touch screen according to the present invention.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-11 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

FIG. 1 is a conceptual cross-sectional view illustrating an optical touch screen according to the present invention.

An optical touch screen according to the present invention includes a camera module (160) and a retro reflector (170), all of which are mounted to a front surface of a flat plate display panel (200). The camera module (160) may include an infrared light emitting diode (100) emitting infrared light, an IR (Infrared) pass filter (130) that passes only the infrared ray reflected from the retro reflector (170), and a linear sensor (150) detecting an area touched by the incident infrared ray that has passed the IR pass filter (130).

The touched area is defined by an area touched by a user on the flat plate display panel (200) of the optical touch screen.

At this time, the optical touch screen may further include an object lens (140) collecting the infrared ray that has passed the IR pass filter (130). Alternatively, the optical touch screen may be so configured as to allow the light emitted from the infrared light emitting diode (100) to be emitted through a lens (110).

Furthermore, the retro reflector (170) reflects the infrared ray emitted from the infrared light emitting diode (100), where an incident angle and reflection angle of the infrared ray are same. Therefore, the infrared light emitting diode (100) of the camera module (160) emits an infrared ray, where the emitted infrared advances along the flat plate display panel (200) to be reflected from the retro reflector (170) and incident on the IR pass filter (130) of the camera module (160).

At this time, the IR pass filter (130) passes only the infrared ray that has been reflected from the retro reflector (170), and the infrared ray that has passed the IR pass filter (130) is incident on the linear sensor (150). In a case a particular area of the flat plate display panel (200) is touched by a finger of a hand (250) while a user views an image displayed on the flat plate display panel (200), the infrared ray is blocked from the touched area to form a black spot on the linear sensor (150), whereby a coordinate of the touched particular area can be detected.

Furthermore, the flat plate display panel (200) is situated under an area between the infrared light emitting diode (100) and the retro reflector (170), and in a case a user touches a particular area of an image displayed on the flat plate display panel, a driving signal is generated that corresponds to a coordinate detected by the linear sensor (150), whereby various functions including screen change, sound adjustment, screen movement, screen enlargement and screen reduction can be performed. At this time, the flat plate display panel may be one of an LCD (Liquid Crystal Display), an FED (Field Emission Display), a PDP (Plasma Display Panel), an EL (Electroluminescence), an OLED (Organic Light Emitting Diode), and an electronic paper display panel.

Figure 2:
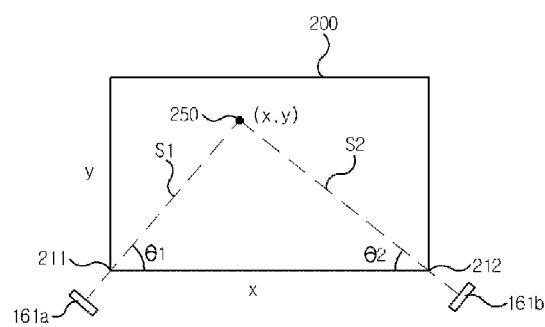
FIG. 2 is a conceptual view illustrating a method for detecting a coordinate of a particular area touched on an optical touch screen according to the present invention.
Figure 3A:
FIGS. 3a and 3b are schematic conceptual views illustrating a linear sensor of an optical touch screen according to the present invention.
Figure 3B:
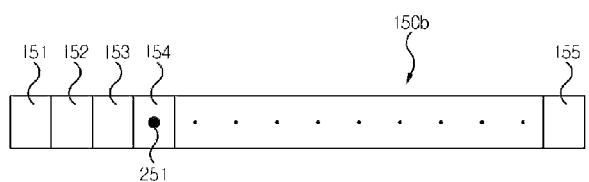

FIG. 2 is a conceptual view illustrating a method for detecting a coordinate of a particular area touched on an optical touch screen according to the present invention, and FIGS. 3a and 3b are schematic conceptual views illustrating a linear sensor of an optical touch screen according to the present invention.

The camera module of the optical touch screen may be installed at two or three corner areas of the flat plate display panel (200). For example, as illustrated in FIG. 2, in a case first and second camera modules (161a, 161b) are mounted on two corner areas (211, 212) of the flat plate display panel (200), and a predetermined area (250) of the flat plate display panel (200) is touched, the touched predetermined area (250) is blocked of infrared ray, and each linear sensor of the first and second camera module (161a, 161b) is formed with a black spot. Therefore, the linear sensor can detect a coordinate of the touched particular area using a position of the black spot.

Each of the linear sensors (150a, 150b) of the first and second camera module (161a, 161b) is mounted with 1st to nth sensing pixel (151, 152, 153, 154, 155) as illustrated in FIGS. 3a and 3b. At this time, in a case the particular predetermined area of the flat plate display panel (200) is touched, one of the 1st to nth sensing pixel (151, 152, 153, 154, 155) is formed with the black spot. Furthermore, because each of the linear sensors (150a, 150b) of the first and second camera module (161a, 161b) is installed at a different position from that of the touched area, there is a high probability that the sensing pixel of the linear sensor (150a) of the first camera module (161a) is differently positioned from the linear sensor (150b) of the second camera module (161b).

For example, as depicted in FIG. 3a, a black spot (251) is formed at the second sensing pixel (152) on the linear sensor (150a) of the first camera module (161a), and as illustrated in FIG. 3b, a black spot (251) is formed at the fourth sensing pixel (154) on the linear sensor (150b) of the second camera module (161b).

Meanwhile, as shown in FIG. 2, if a crosswise direction of the flat plate display panel (200) is defined as an x axis, and a lengthwise direction of the flat plate display panel (200) is defined as a y axis, a coordinate of the touched area (250) can be extracted, if a connection line (S1) from the touched area (250) to the linear sensor (150a) of the first camera module (161a), a first angle (θ1) formed by a crosswise direction of the flat plate display panel (200), a connection line (S2) from the touched area (250) to the linear sensor (150b) of the second camera module (161b), a second angle (θ2) formed by a crosswise direction of the flat plate display panel (200) and a crosswise length of the flat plate display panel (200) are known.

Furthermore, the first angle (θ1) and the second angle (θ2) are changed according to the position of the touched area (250), and in response thereto, the 1st to the nth sensing pixel (151, 152, 153, 154, 155) of the linear sensors (150a, 150b) are subdivided. That is, each of the 1st to the nth sensing pixel (151, 152, 153, 154, 155) of the linear sensors (150a, 150b) corresponds to the first angle (θ1) and the second angle (θ2).

Therefore, in a case a black spot is formed on one of the sensing pixel of the 1st to the nth sensing pixel (151, 152, 153, 154, 155) of the linear sensors (150a, 150b) on the first and second camera modules (161a, 161b), the first angle (θ1) and the second angle (θ2) can be known, whereby a coordinate (x, y) of the touched area (250) can be extracted.

Furthermore, the optical touch screen may include a coordinate extraction calculator capable of extracting in real time a coordinate (x, y) of the touched area (250) touched by the aforementioned method or other methods, in a case a predetermined area (250) of the flat plate display panel (200) is touched.

Figure 4:
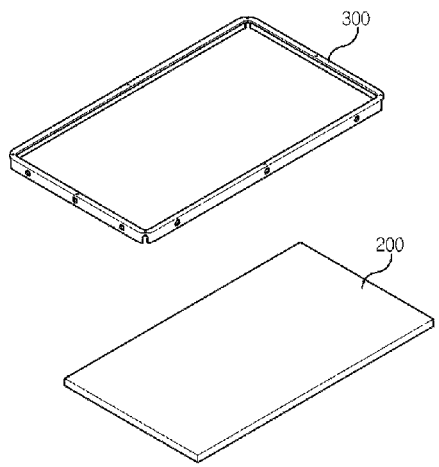
FIG. 4 is a schematic perspective view illustrating a state in which an optical touch screen is fastened according to the present invention.
Figure 5:
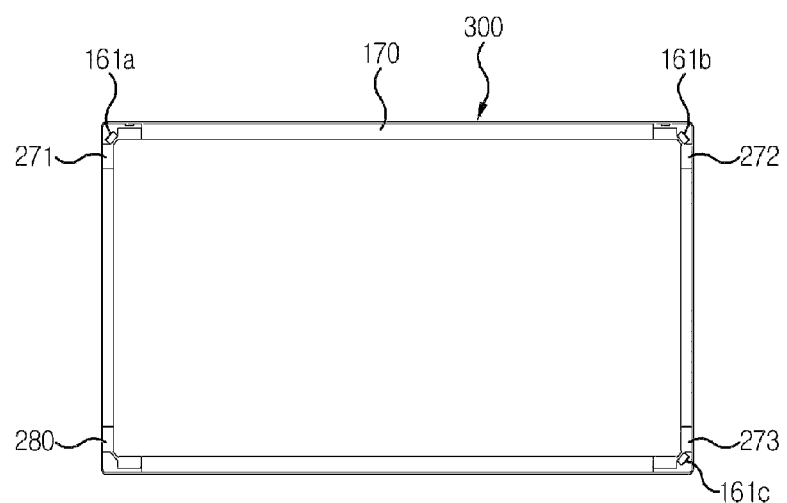
FIG. 5 is a schematic plan view illustrating a case of an optical touch screen according to the present invention.

FIG. 4 is a schematic perspective view illustrating a state in which an optical touch screen is fastened according to the present invention, and FIG. 5 is a schematic plan illustrating a case of an optical touch screen according to the present invention.

The optical touch screen according to the present invention may include a case (300) on which the flat plate display panel (200) is mounted, where the case (300) may be called a case top. The case (300) takes the shape of a square ring, and as shown in FIG. 5, an inner lateral surface of the square ring is mounted with the retro reflector (170), and two or three corner areas of the square ring is mounted and assembled with camera modules (161a, 161b, 161c).

At this time, the camera modules (161a, 161b, 161c) are mounted on brackets (271, 272, 273), and each of the brackets (271, 272, 273) is mounted at three square ring corners. Furthermore, a balance one square ring corner is mounted with a dummy bracket (280) that is not mounted with a camera module. That is, the optical touch screen includes the flat plate display panel (200), the square ring-shaped case (300) on which the flat plate display panel (200) is assembled and attached, the brackets assembled on corners of the case (300), and the camera modules (161a, 161b, 161c). At least one of the brackets is a bracket that is not mounted with the camera modules (161a, 161b, 161c). An inner lateral surface of the case (300) in the brackets is mounted with the retro reflector (170). The retro reflector (170) is also mounted on the dummy bracket (280).

FIGS. 6a through 6d are schematic plans illustrating a method of assembling an optical touch screen according to the present invention.

Figure 6A:
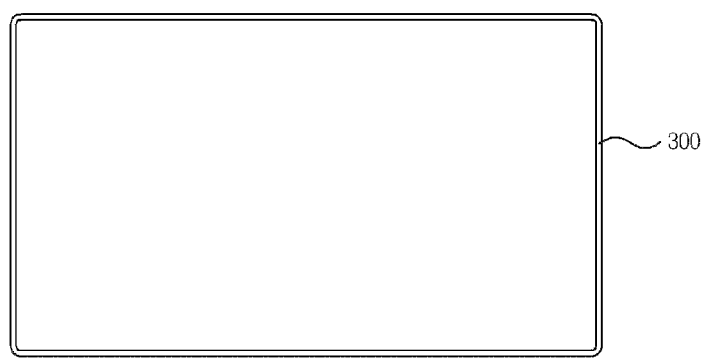
FIGS. 6a through 6d are schematic plan views illustrating a method of assembling an optical touch screen according to the present invention.

The method of assembling an optical touch screen according to the present invention is to first prepare the square ring shaped case (300), as illustrated in FIG. 6a.

Figure 6B:
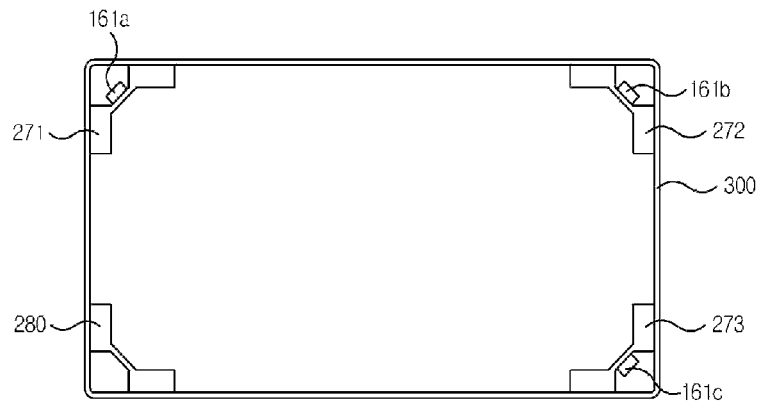

Next, the brackets (271, 272, 273) mounted at three square ring corners of the square ring shaped case (300) are fixed, and the dummy bracket (280) that is not mounted with the camera modules (161a, 161b, 161c) is fixed at one inner lateral corner of the square ring shaped case (300) (FIG. 6b).

In the brackets (271, 272, 273) mounted with the camera modules (161a, 161b, 161c), infrared ray is emitted from the camera modules (161a, 161b, 161c) and the brackets (271, 272, 273) are formed with openings (not shown) through which the infrared ray can be incident reflected from the retro reflector (170). The dummy bracket (280) is not formed with an opening which is not needed.

Figure 6C:
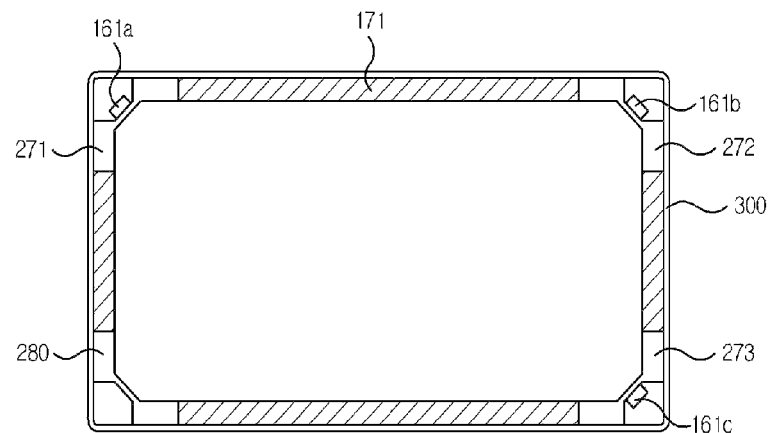
Figure 6D:
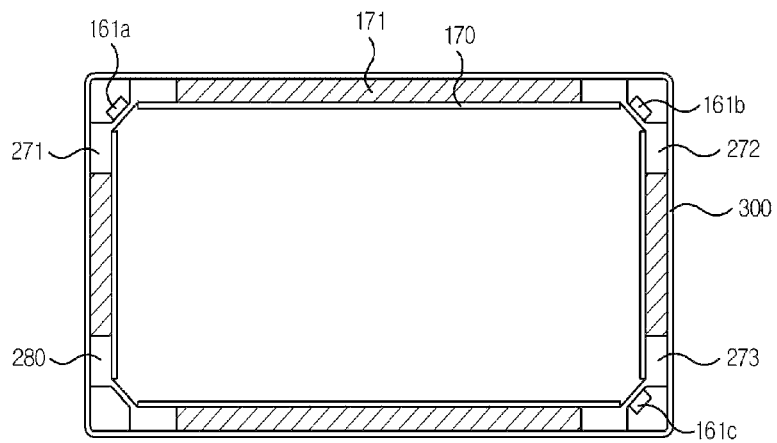

Successively, an inner lateral surface of the case in the brackets (271, 272, 273, 280) is mounted with a frame (171) for fixing the retro reflector (170) (FIG. 6c). Referring to FIG. 6c, the brackets (271, 272, 273, 280) means the brackets (271, 272, 273) that are mounted with camera modules (161a, 161b, 161c) and the dummy bracket (280) that is not mounted with camera module.

Thereafter, the retro reflector (170) is fixed at the frame (171) and the dummy bracket (280) (FIG. 6d), where the retro reflector (170) can be fixed without blocking each opening of the brackets (271, 272, 273) mounted with camera modules (161a, 161b, 161c). Following the assembly process of FIG. 6d, the flat plate display panel (200) is mounted on the case (300).

Figure 7:
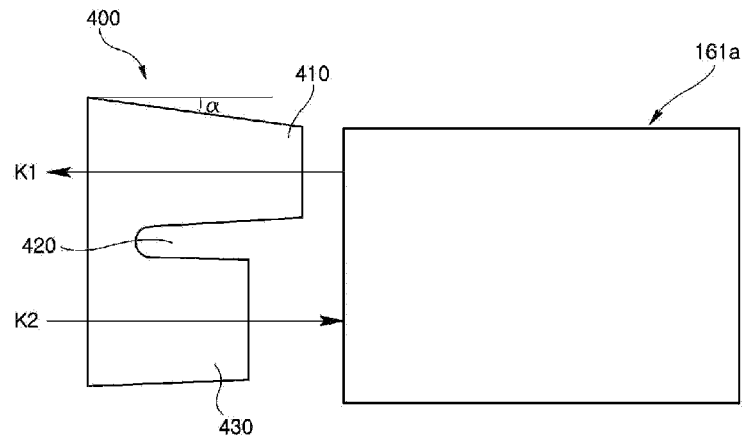
FIG. 7 is a schematic view illustrating an infrared pass filter aligned on a camera module according to the present invention.

FIG. 7 is a schematic view illustrating an infrared pass filter aligned on a camera module according to the present invention.

The fact that infrared ray (K1) emitted from a camera module (161a) and infrared ray (K2) incident on the camera module (161a) pass an infrared pass filter (400) can improve a touch sensitivity of an optical touch screen.

Therefore, the present invention is advantageous in that the infrared pass filter (400) is integrally formed to enable an easy alignment with the camera module (161a), and mutual interference between the infrared ray (K1) emitted from the camera module (161a) and infrared ray (K2) incident on the camera module (161a) is prevented to improve a touch sensitivity.

That is, the infrared pass filter (400) includes a first area (410) through which the infrared ray (K1) emitted from the camera module (161a) and a second area (430) discretely located from the first area (410) for passing the infrared ray (K2) incident on the camera module (161a).

At this time, the first and second areas (410, 430) are integrally formed, and at least one air layer (420) is formed between the first and second areas (410, 430).

The first and second areas (410, 430) are separated by the air layer (420), such that each peripheral surface of the first and second areas (410, 430) is formed with an air layer. Therefore, the infrared passing the first and second areas (410, 430) is totally reflected to prevent any optical loss.

At this time, a distal end from which the infrared ray of the first area (410) is emitted, and a distal end on which infrared ray is incident from the second area (430) are connected to allow the infrared pass filter to be integrally formed.

Furthermore, the first area may be inclined at an angle (α) of 3~11 degrees in order to improve a total reflection of the emitted infrared ray, where the total reflection is deteriorated if the angle (α) is smaller than 3 degrees, or larger than 11 degrees.

For reference, the infrared pass filter in FIG. 1 with reference numeral '130' has described only a filter through which infrared ray incident on the camera module (161a) passes, and the infrared pass filter (400) in FIG. 7 is a filter through which infrared ray incident on and emitted from the camera module (161a) can pass.

Therefore, the camera module according to the present invention includes an infrared emitting diode for emitting infrared ray, a linear sensor for detecting a touched area by detecting infrared ray reflected from a retro reflector, and an infrared pass filter for passing the infrared ray emitted from the infrared emitting diode and infrared ray incident on the linear sensor.

Furthermore, an optical touch screen using a camera module according to the present invention includes a flat plate display panel, a case mounted and assembled with the flat plate display panel, a bracket assembled on the case, a camera module mounted on the bracket, and an infrared pass filter for passing infrared ray emitted from the camera module and infrared ray incident on the camera module.

Figure 8:
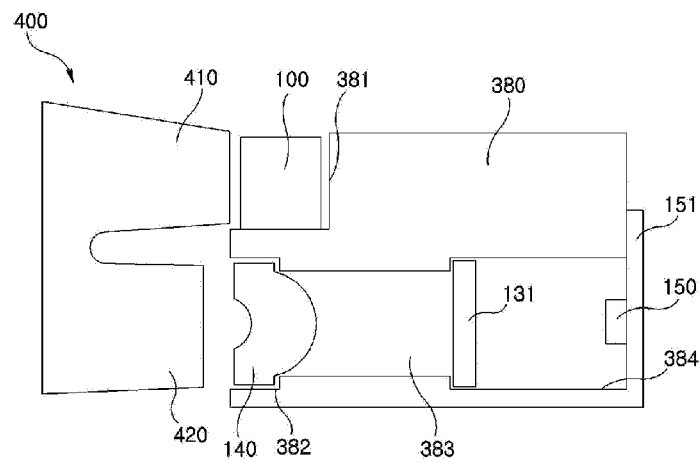
FIG. 8 is a schematic cross-sectional view illustrating an infrared pass filter and a camera module according to an exemplary embodiment of the present invention.

FIG. 8 is a schematic cross-sectional view illustrating an infrared pass filter and a camera module according to an exemplary embodiment of the present invention.

Referring to FIG. 8 for describing an exemplary structure of a camera module according to the present invention, the camera module includes a holder (380) formed at one side with a first groove (382), and at the other side with a second groove (384), and formed with an opening (383) connecting the first and second grooves, (382, 384) and formed at an upper surface of the one side with a stair unit (381), wherein the first groove (382) is mounted with an object lens (140), the second groove (384) is mounted with an infrared pass filter (131) passing an infrared ray of a particular wave band, a printed circuit board (151) mounted with an image sensor (150) is attached to the holder (380) to close the second groove (384), and the stair unit (381) is mounted with the infrared emitting diode (100).

The infrared pass filter (131) mounted at the second groove may be implemented by coating on a glass an infrared pass filter material for passing an infrared ray of a particular wave band. The glass functions as a cover plate for protecting the image sensor. The stair unit (381) may be mounted with the infrared emitting diode (100).

At this time, the first area (410) of the infrared emitting diode (100) is aligned with the infrared emitting diode (100), and the second area (430) of the infrared pass filter (400) is aligned with the object lens (140).

Therefore, the infrared ray emitted from the infrared light emitting diode (100) advances to an upper surface of the flat plate display panel through the first area (410) of the infrared pass filter (400) to be reflected by the retro reflector, where the reflected infrared ray passes the second area (430) of infrared pass filter (400), the object lens (140) and the infrared pass filter (131) that passes infrared ray of a particular wavelength band to be incident on the image sensor (150) and to detect the touch.

Figure 9:
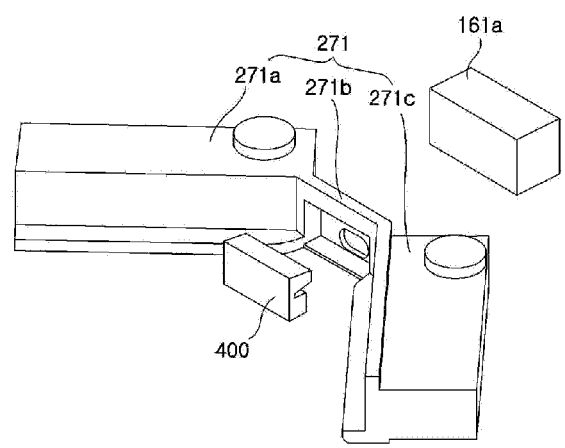
FIG. 9 is schematic perspective view illustrating a state of an infrared pass filter and a camera module prior to installation to a bracket according to the present invention.
Figure 10:
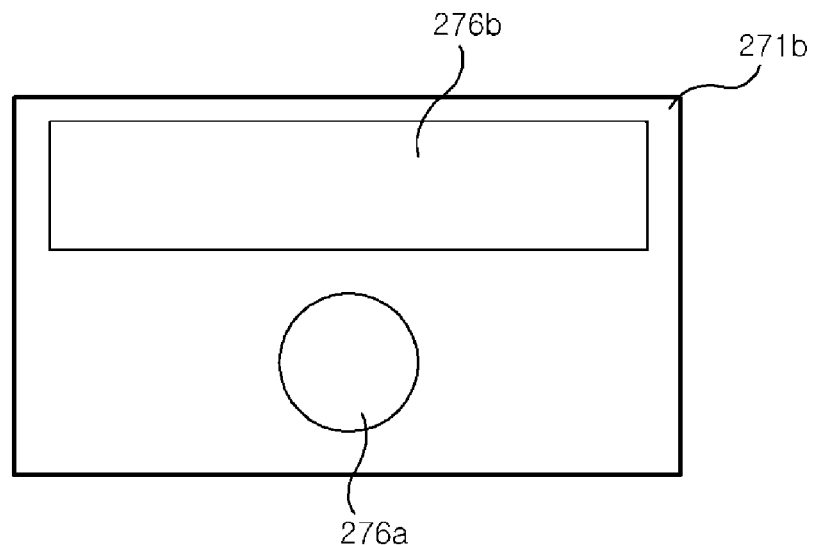
FIG. 10 is a schematic front view illustrating a connector of a bracket according to the present invention.

FIG. 9 is schematic perspective view illustrating a state of an infrared pass filter and a camera module prior to installation to a bracket according to the present invention, and FIG. 10 is a schematic front view illustrating a connector of a bracket according to the present invention.

As mentioned in the foregoing, the camera module (161a) is mounted at the bracket (271), and the bracket (271) is mounted at the case.

At this time, as shown in FIG. 9, the bracket (271) includes first and second fixtures (271a, 271c) fixed on the case, and a connector (271b) connected to the first and second fixtures (271a, 271c), wherein the camera module (161a) is mounted to a rear surface of the connector (271b).

Referring to FIG. 10, the connector (271b) of the bracket (271) includes an iris (276a) for adjusting amount of infrared ray incident on the camera module, and a passage (276b) through which the infrared ray emitted from the camera module passes. The position where the iris (276a) and the passage (276b) are formed at the connector (271b) of the bracket (271) is not limited to a position illustrated in FIGS. 9 and 10. The position may be variably implemented.

However, as illustrated in FIG. 10, the iris (276a) is preferably positioned at a place lower than that of the passage (276b) for technical prevalence, such that the infrared ray is emitted from an upper surface of the camera module (161a) and the infrared ray is incident from under.

Therefore, the infrared emitted from the camera module (161a) is emitted through the passage (276b) of the bracket (271), reflected from the retro reflector mounted at the case, and incident on the camera module through the iris (276a) of the bracket (271) to detect the touch.

At this time, size of the iris (276a) can adjust amount of infrared ray incident on the camera module. For example, a large size of iris (276b) can receive a larger amount of infrared ray than a small size of the iris (276b).

Therefore, the optical touch screen according to the present invention is advantageous in that an iris is formed at a bracket mounted with a camera module, whereby there is no need of forming an additional iris structure to thereby reduce the manufacturing cost.

MODE FOR THE INVENTION

Figure 11:
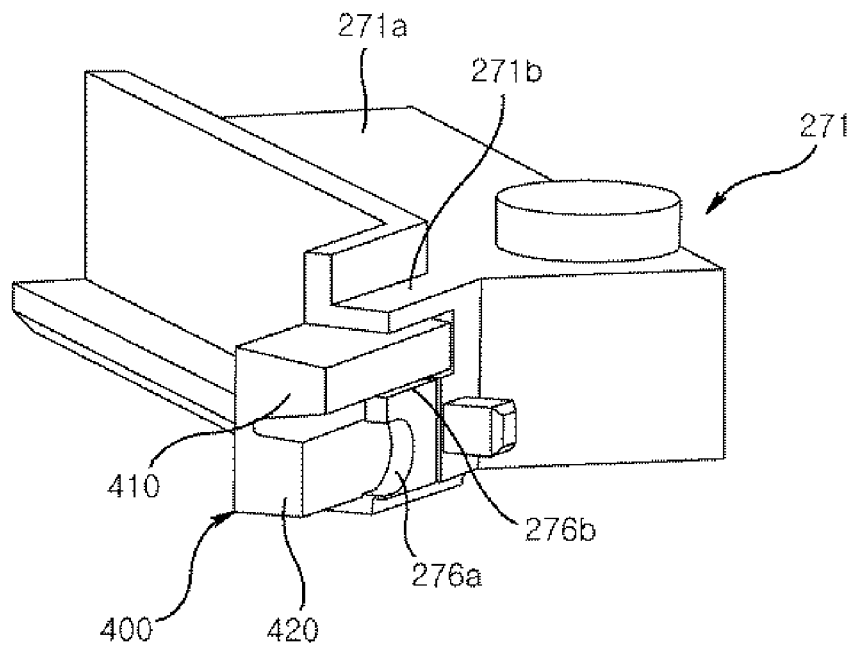
FIG. 11 is a partially-cut schematic perspective view illustrating a state in which an infrared pass filter is mounted at a bracket according to the present invention.

FIG. 11 is a partially-cut schematic perspective view illustrating a state in which an infrared pass filter is mounted at a bracket according to the present invention.

The camera module is mounted at a rear surface of the connector (271b) of the bracket (271), and the infrared pass filter (400) is mounted at a front surface of the connector (271b) of the bracket.

At this time, the first area (410) of the infrared pass filter (400) is aligned at the passage (276b) of the connector (271b) of the bracket (271), and aligned at the iris (276a) of the second area (430) of the infrared pass filter (400).

Furthermore, the connector (271b) of the bracket (271) is formed with a groove (not shown) in which the infrared pass filter (400) is inserted and fixed, and the groove is positioned therein with the passage (276b) and the iris (276a).

Therefore, the present invention is advantageous in that the infrared pass filter (400) is integrally formed with the first and second areas (410, 430) through which infrared ray emitted from the camera module and infrared ray incident on the camera module, to allow being optically aligned with the camera module, whereby processes can be simplified.

The camera module and optical touch screen using the same according to the present invention has an advantageous effect in that two constituent elements, through which infrared emitted from the camera module and infrared ray incident on the camera module can pass, are integrally formed to reduce the manufacturing cost.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The present invention has an industrial applicability in that an assembly-simplifying process can be applied to a camera module and a touch screen.

The invention claimed is:

1. A camera module, the module comprising:
   an infrared emitting diode for emitting infrared ray;
   a linear sensor for detecting a touched area by detecting infrared ray reflected from a retro reflector; and
   an infrared pass filter for passing the infrared ray emitted from the infrared emitting diode and infrared ray incident on the linear sensor,
   wherein the infrared pass filter includes a first area through which the infrared ray emitted from the infrared emitting diode passes, and a second area discretely located from the first area for passing the infrared ray incident on the linear sensor, and
   wherein the first and second areas are integrally formed, and an air layer is formed between the first and second areas.

2. The module of claim 1, wherein the first area is inclined at 3~11 degrees.

3. The module of claim 1, wherein the camera module includes a holder formed at one side with a first groove, and at the other side with a second groove, and formed with an opening connecting the first and second grooves, and formed at an upper surface of the one side with a stair unit, wherein the first groove is mounted with an object lens, the second groove is mounted with the infrared pass filter, a printed circuit board mounted with an image sensor is attached to the holder, and the stair unit is mounted with the infrared emitting diode.

4. The module of claim 3, wherein the infrared pass filter mounted at the second groove is implemented by coating on a glass an infrared pass filter material passing an infrared ray of a particular wave band.

5. The module of claim 3, wherein the first area of the infrared pass filter is aligned with the infrared emitting diode, and the second area of the infrared pass filter is aligned with the object lens.

6. An optical touch screen using a camera module, the screen comprising:
   a flat plate display panel;
   a case mounted and assembled with the flat plate display panel;
   a bracket assembled on the case;
   a camera module mounted on the bracket; and
   an infrared pass filter passing infrared ray emitted from the camera module and infrared ray incident on the camera module,
   wherein the camera module includes an infrared emitting diode emitting infrared ray, and a linear sensor for detecting a touched area by detecting infrared ray reflected from a retro reflector,
   wherein the infrared pass filter includes a first area through which the infrared ray emitted from the infrared emitting diode passes, and a second area discretely located from the first area for passing the infrared ray incident on the linear sensor, and
   wherein the first and second areas are integrally formed, and an air layer is formed between the first and second areas.

7. The optical touch screen of claim 6, wherein the first area is inclined at 3~11 degrees.

8. The optical touch screen of claim 6, wherein the bracket includes first and second fixtures fixed on the case, and a connector connected to the first and second fixtures, wherein the camera module is mounted to a rear surface of the connector, and the infrared pass filter is mounted on a front surface of the connector.

9. The optical touch screen of claim 8, wherein the connector of the bracket includes an iris for adjusting amount of infrared ray incident on the camera module, and a passage through which the infrared ray emitted from the camera module passes.

10. The optical touch screen of claim 6, wherein the camera module includes a holder formed at one side with a first groove, and at the other side with a second groove, and formed with an opening connecting the first and second grooves, and formed at an upper surface of the one side with a stair unit, wherein the first groove is mounted with an object lens, the second groove is mounted with the infrared pass filter passing an infrared ray of a particular wave band, a printed circuit board mounted with an image sensor is attached to the holder to close the second groove, and the stair unit is mounted with the infrared emitting diode.

11. The optical touch screen of claim 10, wherein the infrared pass filter mounted at the second groove is implemented by coating on a glass an infrared pass filter material passing an infrared ray of a particular wave band.

12. The optical touch screen of claim 10, wherein the first area of the infrared pass filter is aligned with the infrared emitting diode, and the second area of the infrared pass filter is aligned with the object lens.

13. The optical touch screen of claim 6, wherein the case takes the shape of a square ring.

14. The optical touch screen of claim 13, wherein three inner corners of the square ring-shaped case are fixed by brackets on which the camera module is mounted, and one inner corner of the square-ring shaped case is mounted with a dummy bracket on which the camera module is not mounted.

15. The optical touch screen of claim 14, wherein the retro reflector is mounted on an inner lateral surface of the case among the brackets.

* * * * *